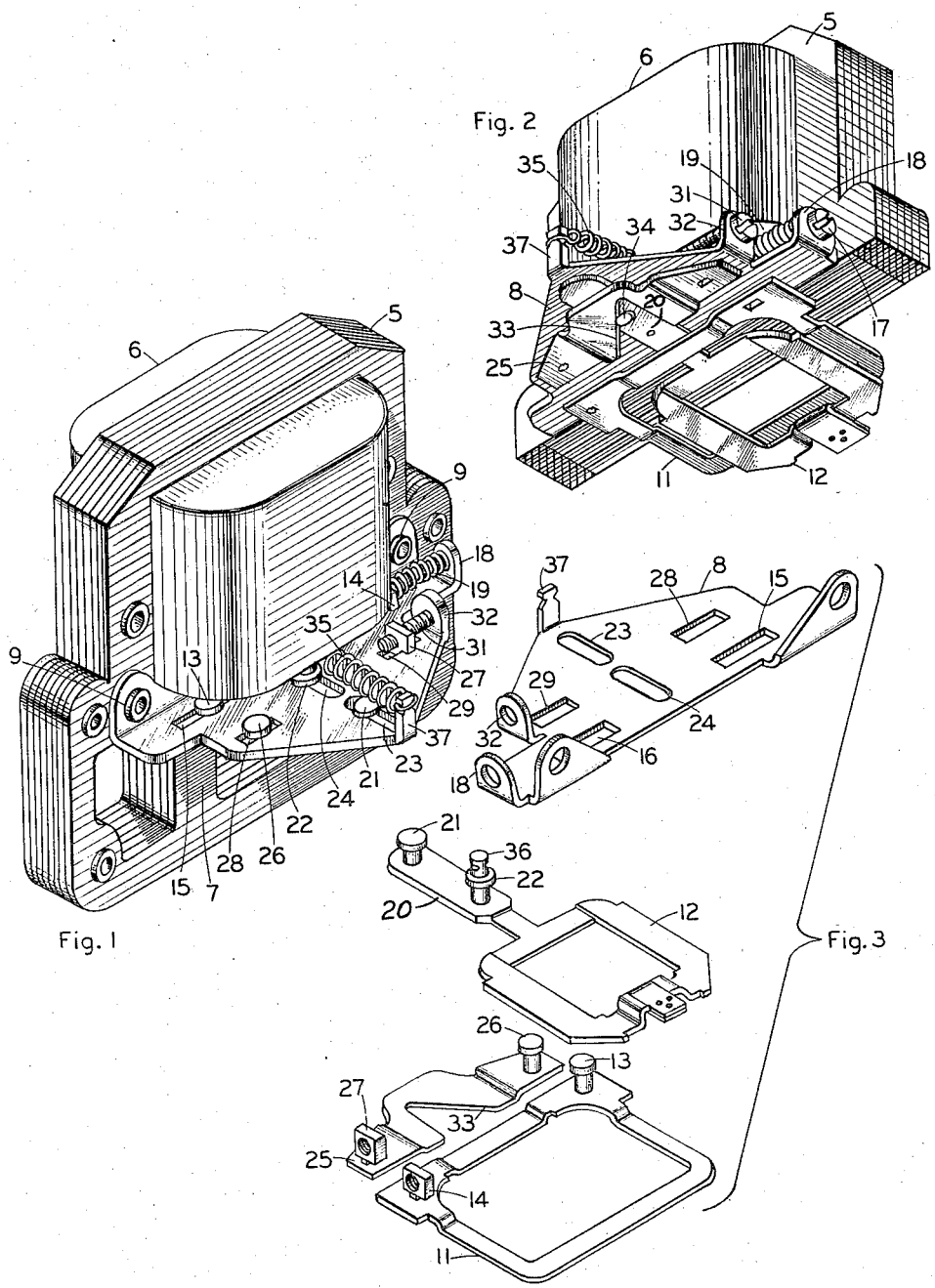

United States Patent Office 2,879,476
Patented Mar. 24, 1959

2,879,476

ARRANGEMENT OF LAG AND LIGHT LOAD COMPENSATORS IN AN INDUCTION WATTHOUR METER

Dankmar Hallbauer, Somersworth, N.H., assignor to General Electric Company, a corporation of New York Application December 24, 1956, Serial No. 630,293

4 Claims. (Cl. 324—138)

This invention relates to an improved arrangement of lag and light load compensators in an induction watthour meter and has for its objects the provision of an arrangement that is inexpensive to manufacture, that allows for all compensating adjustment to be done with a screw driver in one localized area within the meter, and that eliminates back-lash in the adjusting and mounting arrangements.

Lag and light load compensating members for induction watthour meters are well known in the watthour meter art and in one form comprise electrically conducting loops arranged to link portions of the torque-producing flux developed within the meter. The loops may be adjustably mounted to alter their flux-linking effect for purposes of calibration, and it is desirable when providing for such adjustments to minimize the manufacturing costs and complexity of design attendant thereto. Since the loops are mounted to move for adjustment purposes, it is also desirable to eliminate all back-lash in the movably mounted parts permitting such motion in order to retain the calibrating adjustments after they have once been established.

In the present invention, the lag and light load members are in the form of electrically conducting loops, both of which are slidably mounted on a bracket that is affixed to and extends along one side of the electromagnet assembly forming a part of a watthour meter. Each loop may be moved for calibration purposes by an associated spring-loaded adjusting screw, the two screws being conveniently mounted in one end of the bracket to facilitate adjustment. The loops move at right angles to each other when adjusted, and a driving link of novel form is interposed between one of the screws and its associated loop to obtain the required direction of motion. In addition, back-lash is eliminated in the moving parts and the overall arrangement may be inexpensively manufactured.

The invention will be readily understood upon reference to the following description, when taken in conjunction with the drawing annexed hereto, in which:

Figure 1 is a perspective view, looking down on a portion of an induction watthour meter, illustrating the overall arrangement of the invention as applied thereto;

Figure 2 is a perspective view, looking up at a portion of the apparatus disclosed in Figure 1; and Figure 3 is an exploded view of the major parts forming the invention.

Referring first to Figure 1, there is shown a portion of a conventional watthour meter, the parts shown being sufficient to illustrate the invention, with the remaining parts which form a complete meter being omitted, in view of the fact that the operation and structure of induction watthour meters is so well known to those skilled in the art that further explanation is unnecessary herein. Suffice to say that the meter includes an electromagnet having a core 5 with a central leg (not shown) in the upper half thereof which carries a voltage winding 6 and a pair of spaced legs in the lower half thereof which may carry suitable current windings, one of these legs being shown at 7. The voltage and current sections of the meter are separated by an air gap and the arrangement is such that the voltage half of the electromagnet defines a single voltage flux pole and the current half defines a pair of spaced current flux poles. A rotary disc armature lies within the air gap between the voltage and current flux poles and interacts with the two sets of flux to rotate in the known manner.

Mounted on the upper half of core 5 and extending along the side thereof is a bracket 8 which may be secured to the core by rivets 9 or the like. Bracket 8 provides support for the light load and lag compensating members, both of which are in the form of electrically conducting loops, being shown at 11, 12, respectively.

The bracket and its associated loops may all be fabricated from suitable metallic sheet stock, and each loop is slidably mounted on the bracket. In the case of loop 11, it is supported by a pair of guide pins 13, 14, having their shanks lying within the aligned guide slots 15, 16, each pin having an enlarged head which together hold the light load loop on the bracket. In the case of pin 14, its head is in the form of a nut in which is threaded a screw 17 mounted in the ear 18 formed on the end of bracket 8. Screw 17 is spring-loaded by means of the coil spring 19 surrounding its shank and lying between the nut and the bracket ear. Adjustment of screw 17 causes light load loop 11 to move in a side-to-side manner in the air gap across the face of the voltage flux pole, and once the proper compensating position has been established, spring 19 will hold the loop permanently in such position.

The lag loop 12 is formed with a mounting tongue 20 and is supported on bracket 8 by a pair of spaced pins 21, 22 affixed to the tongue and having their shanks lying within the aligned slots 23, 24, with each pin having an enlarged head which together hold the lag loop on the bracket. The tongue 20 passes over an off-set portion of light load loop 11 and the loop 12 passes under the outer portion of loop 11, this outer portion being offset to allow loop 11 to move freely for adjustment purposes. By the same token, loop 12 can move freely for adjustment purposes because of the offsetting of the inner portion of loop 11.

To move the loop 12, a driving link 25 is slidably mounted on bracket 8, being supported thereon by the spaced pins 26, 27, having their shanks lying within the aligned slots 28, 29, with each pin having an enlarged head which together hold the link on the bracket. The head of pin 27 is in the form of a nut which receives the adjusting screw 31 extending through another ear 32 formed in bracket 8 adjacent to ear 18.

Driving link 25 has an inclined cam section 33 which cooperates with a cam follower in the form of pin 34 attached to the underside of tongue 20. A spring 35 is provided to take up all backlash between the lag loop and the driving link, one end of the spring being coupled to the notched projection 36 formed above the head of pin 22, with the other end of the spring being coupled to an upstanding portion 37 formed in bracket 8. Spring 35 also takes up backlash in the screw 31 and, in cooperation with the cam section 33 and its associated cam follower, pin 34 always urges the pins 21 and 22 toward the adjusting screws and then against corresponding edges of slots 23, 24; that is, the pins 21, 22 will be urged to the right of the electromagnet, as viewed in the drawing. In this manner, the lag loop 12 will hold its calibrating position after it has been once established.

To adjust the position of lag loop 12, it is only necessary to manipulate screw 31 against the loading of spring 35 to thereby change the position of driving link 25. As the link moves, the cam section 33, in cooperation with the pin 34 and spring 35, causes the lag loop 12 to move in an in-and-out manner in the air gap across the face of the voltage flux pole. The lag loop moves at right angles to the light load loop, and adjustment of the position of either is unaffected by any adjustment in the position of the other. The two loops are thus independently adjustable to establish proper light-load and lag compensation.

Both loops may be quickly and conveniently adjusted from the same end of bracket 8, with all backlash eliminated from each adjusting means, and it is quite apparent that the loops and their associated mounting and adjusting means may be readily and inexpensively manufactured.

Moreover, the invention may be used with both single-phase and polyphase induction watthour meters, and in the case of a two-stator polyphase meter having a V arrangement of its stators, it is quite apparent that the present invention is ideally suited to such an arrangement, since the lag and light-load adjusting screws for each stator may be located at corresponding ends of the stators to allow for adjustment of both sets of screws from the front of the meter.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In an induction watthour meter having a rotary disc armature and including an electromagnet defining a voltage flux pole and a pair of spaced current flux poles with the current and voltage flux poles separated by an air gap in which said armature moves, an improved arrangement of lag and light load compensators therefor, comprising, in combination: a mounting bracket affixed to said electromagnet and extending along one side thereof, a light load compensator in the form of a first electrically conducting loop slidably mounted on said bracket and arranged to move linearly in a side-to-side manner in said air gap, means for moving said first loop including a first spring-loaded adjusting screw mounted at one end of said bracket, a lag compensator in the form of a second electrically conducting loop slidably mounted on said bracket and arranged to move linearly in an in-and-out manner in said air gap in a direction perpendicular to the direction of motion of said first loop, said first and second loops moving independently of each other, a driving link slidably mounted on said bracket for movement in a direction parallel to the direction of motion of said first loop, said driving link including a cam section, a cam follower fixed with said second loop in cooperative relationship with said cam section, and a second spring-loaded adjusting screw mounted at said one end of said bracket and coupled to said driving link, whereby angular adjustments of said second screw are effective to regulate the relationships between said cam section and said cam follower and thereby to regulate the positions of said second loop along said perpendicular direction.

2. In an induction watthour meter having a rotary disc armature and including an electromagnet defining a voltage flux pole and a pair of spaced current flux poles with the current and voltage flux poles separated by an air gap in which said armature moves, an improved arrangement of lag and light load compensators therefor, comprising, in combination: a mounting bracket affixed to and extending along one side of said electromagnet and having a pair of spaced aligned slots extending in one direction, a light load compensator in the form of a first electrically conducting loop slidably mounted on said bracket and arranged to move linearly in a side-to-side manner in said air gap, means for moving said first loop including a first spring-loaded adjusting screw mounted at one end of said bracket, a lag compensator in the form of a second electrically conducting loop slidably mounted on said bracket and arranged to move linearly in an in-and-out manner in said air gap in a direction perpendicular to the direction of motion of said first loop, said first and second loops moving independently of each other, a pair of guide pins fixed with said second loop and lying within said slots, a driving link slidably mounted on said bracket for movement in a direction parallel to the direction of motion of said first loop, said driving link including an inclined cam section, a cam follower in the form of a first pin fixed with said second loop in cooperative relationship with said inclined cam section, and a second spring-loaded adjusting screw mounted at said one end of said bracket and coupled to said driving link, whereby angular adjustments of said second screw are effective to regulate the relationships between said cam section and said cam follower pin and thereby to regulate the positions of said second loop along said perpendicular direction.

3. In an induction watthour meter having a rotary disc armature and including an electromagnet defining a voltage flux pole and a pair of spaced current flux poles with the current and voltage flux poles separated by an air gap in which said armature moves, an improved arrangement of lag and light load compensators therefor comprising, in combination: a mounting bracket affixed to and extending along one side of said electromagnet and having a pair of spaced aligned slots extending in one direction, a light load compensator in the form of a first electrically conducting loop slidably mounted on said bracket and arranged to move linearly in a side-to-side manner in said air gap, means for moving said first loop including a first spring-loaded adjusting screw mounted at one end of said bracket, a lag compensator in the form of a second electrically conducting loop slidably mounted on said bracket and arranged to move linearly in an in-and-out manner in said air gap in a direction perpendicular to the direction of motion of said first loop, said first and second loops moving independently of each other, a pair of guide pins fixed with said second loop and lying within said slots, means for moving said second loop including a driving link having an inclined cam section and slidably mounted on said bracket to move in a direction parallel to the direction of motion of said first loop, a cam follower pin fixed with said second loop and cooperating with the inclined cam section of said link, a second adjusting screw mounted at said one end of said bracket, said second screw being coupled to said driving link and said driving link being coupled to said second loop, and a spring having one end affixed to one of said guide pins and the other end affixed to said bracket, said spring being aligned with said slots with the other of said guide pins lying between the ends of said spring, said spring and said inclined cam section and associated cam follower cooperating to eliminate back-lash in the means for moving said second loop, each of said guide pins being continuously urged against corresponding edges of said slots.

4. In an induction watthour meter having a rotary disc armature and including an electromagnet defining a voltage flux pole and a pair of spaced current flux poles with the current and voltage flux poles separated by an air gap in which said armature moves, an improved arrangement of lag and light load compensators therefor, comprising, in combination: a mounting bracket affixed to said electromagnet and extending along one side thereof, a light load compensator in the form of a first electrically conducting loop slidably mounted on said bracket and arranged to move linearly in a side-to-side manner in said air gap, means for moving said first loop including a first spring-loaded adjusting screw mounted at one end of said bracket, a lag compensator in the form of a second electrically conducting loop slidably mounted on said bracket and arranged to move linearly in an in-and-out manner in said air gap in a direction perpendicular to the direction of motion of said first loop, said first and second loops moving independently of each other, a driving link slidably mounted on said bracket for movement in a direction parallel to the direction of motion of said first loop, said driving link including a cam section, a cam follower fixed with said second loop in cooperative relationship with said cam section, a second adjusting screw mounted at said one end of said bracket and coupled to said driving link, spring means exerting force between said second loop and said bracket to urge said follower into engagement with said cam section, whereby angular adjustments of said second screw regulate the relationships between said cam section and said cam follower and thereby regulate the positions of said second loop along said perpendicular direction.

References Cited in the file of this patent

UNITED STATES PATENTS

| | | |
|---|---|---|
| 1,180,795 | Pratt | Apr. 25, 1916 |
| 2,146,606 | Trekell | Feb. 7, 1939 |
| 2,240,666 | Mylius | May 6, 1941 |

FOREIGN PATENTS

| | | |
|---|---|---|
| 493,689 | Great Britain | Oct. 12, 1938 |